(12) United States Patent
Bonham et al.

(10) Patent No.: US 7,387,195 B2
(45) Date of Patent: Jun. 17, 2008

(54) CONVEYOR SYSTEM AND METHOD

(75) Inventors: Boyce Bonham, Bono, AR (US);
Richard Potter, Paragould, AR (US);
Wendell Rogers, Paragould, AR (US);
Chuck Palmer, Trumann, AR (US)

(73) Assignee: Hytrol Conveyor Company, Inc., Jonesboro, AR (US)

( * ) Notice: Subject to any disclaimer, the term of this patent is extended or adjusted under 35 U.S.C. 154(b) by 1 day.

(21) Appl. No.: 11/609,050

(22) Filed: Dec. 11, 2006

(65) Prior Publication Data

US 2007/0135964 A1 Jun. 14, 2007

Related U.S. Application Data

(60) Provisional application No. 60/749,391, filed on Dec. 12, 2005.

(51) Int. Cl.
*B65G 47/10* (2006.01)

(52) U.S. Cl. .................. 198/370.01; 198/781.06; 198/349.1

(58) Field of Classification Search ........... 198/781.06, 198/571, 575, 358, 349.1, 370.01, 370.04; 700/228, 230

See application file for complete search history.

(56) References Cited

U.S. PATENT DOCUMENTS

| | | | | |
|---|---|---|---|---|
| 5,482,154 A | * | 1/1996 | Affeldt et al. ......... | 198/370.04 |
| 5,509,538 A | * | 4/1996 | Spindler et al. ....... | 198/370.01 |
| 5,862,907 A | * | 1/1999 | Taylor .................. | 198/781.06 |
| 5,990,437 A | * | 11/1999 | Coutant et al. ........ | 198/370.04 |
| 6,315,104 B1 | | 11/2001 | Ebert | |
| 6,729,463 B2 | * | 5/2004 | Pfeiffer ................. | 198/575 |
| 6,876,888 B2 | * | 4/2005 | Locke .................. | 198/370.04 |
| 7,104,395 B2 | * | 9/2006 | Brown et al. .......... | 198/781.06 |
| 7,280,889 B2 | * | 10/2007 | Knepple et al. ........ | 198/460.1 |

* cited by examiner

*Primary Examiner*—James R Bidwell
(74) *Attorney, Agent, or Firm*—Alston & Bird LLP

(57) ABSTRACT

A conveyor system for sorting objects is provided. The conveyor system includes a plurality of lanes arranged in series with one another, wherein each of the lanes is operable to convey and sort a plurality of objects therealong. The conveyor system also includes at least one peripheral device associated with at least one of the lanes that is operable to facilitate the conveying and sorting of the objects. The system also includes logic circuitry in communication with the at least one peripheral device, as well as at least one distribution device in communication with the logic circuitry and the at least one peripheral device. Each distribution device includes a plurality of ports for receiving respective cables therein, and at least one cable couples the logic circuitry and the distribution device and at least one cable couples each peripheral device and the distribution device, wherein each of the cables are coupled without hard wiring.

20 Claims, 15 Drawing Sheets

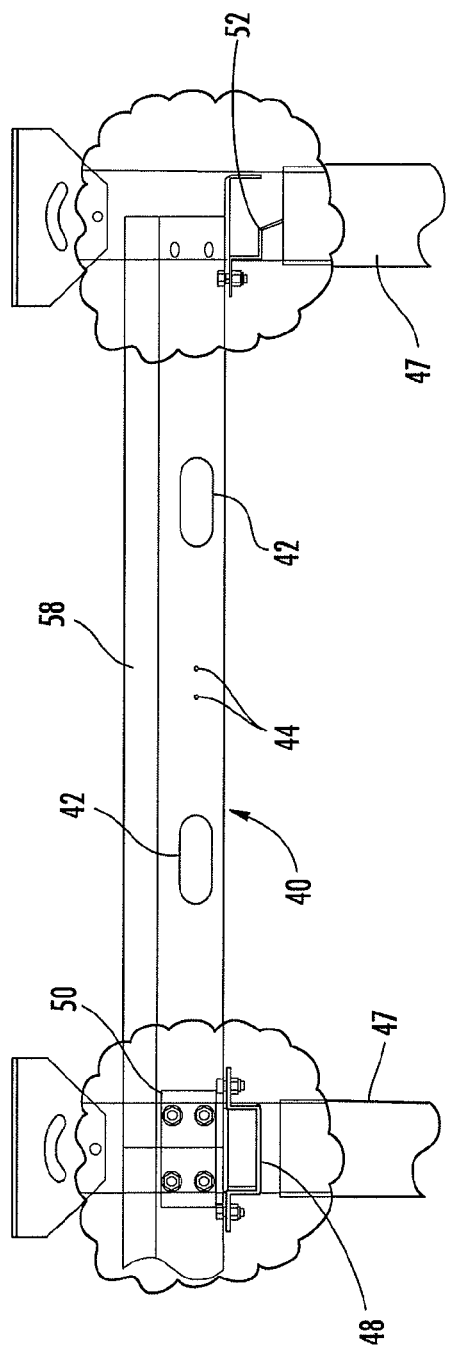
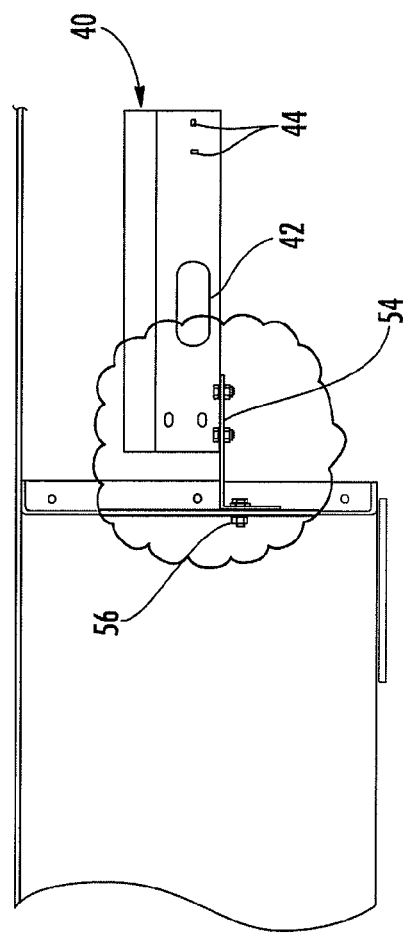
FIG. 18
FIG. 19

CONVEYOR SYSTEM AND METHOD

CROSS-REFERENCE TO RELATED APPLICATIONS

The present application claims priority from U.S. Provisional Application No. 60/749,391 entitled "Conveyor System and Method," filed Dec. 12, 2005, the contents of which is incorporated in its entirety herein by reference.

BACKGROUND OF THE INVENTION

1. Field of the Invention

The present invention is directed to conveyor systems, and more particularly, to a system for sorting objects.

2. Description of Related Art

Conveyor systems are used to transport goods, packages, cartons and other objects in all types of environments and experience heavy use in the manufacturing and shipping industries. Complex conveyor systems typically require several conveyor lines and lanes that cooperate with one another to transport or sort objects, as well as various peripheral devices that are associated with each conveyor lane (e.g., sensors, solenoids, motors, etc.). As such, systems for networking and distributing the input/output ("I/O") of communication and power between the conveyer lanes and/or various peripheral devices are typically employed.

Conventional conveyor systems require that power and/or communication wires be hard wired between logic circuitry and various peripheral devices associated with each conveyor lane. For example, the conveyor system would require power and/or communication lines from logic circuitry to be hard wired to each individual component. In particular, a sensor that communicates inputs to logic circuitry would at least require power and communication wires to operate. Hard wiring the conveyor systems requires considerable labor and time to set up and assemble, as a licensed electrician is needed to ensure that the hard wiring is set up correctly. Furthermore, hard wiring the conveyor systems requires individually running the wires through conduit between logic circuitry and each of the peripheral devices, which also requires considerable time to install.

Networked conveyor systems have been developed that reduce the set up and assembly time typically required for hard-wired conveyor systems. Namely, networked conveyor systems utilize a single cable bundling power and/or communication that is capable of providing power and/or communication to each individual component associated with the conveyor system. Thus, each component does not require a wire that is individually hard wired to the logic circuitry. However, networked conveyor systems require that particular peripheral devices, such as sensors that communicate with logic circuitry, be "intelligent." In this regard, these peripheral devices must be addressable and provide identification information to the logic circuitry so that the logic circuitry may send an output signal to respond to the device sending the identification information. As such, these peripheral devices are typically more expensive than peripheral devices that do not need to provide identification information. In addition, because some peripheral devices must provide identification information before the logic circuitry may send an output signal, the response time of the conveyor system is sacrificed. For instance, a conveyor system that sorts objects typically makes real-time decisions, such as diversion decisions, which would generally be more difficult to achieve with a networked sorter where each of the sensors would have to be scanned to first identify the sensor and determine the location of the sensor that sent an input signal necessitating the diversion decision.

Thus, there remains a need for a conveyor system that can efficiently and effectively receive and distribute at least power and/or communication between various peripheral devices associated with the conveyor system. In addition, there remains a need for a conveyor system that is cost effective and uncomplicated to assemble and disassemble. Furthermore, there is a need for a conveyor system that may readily interconnect a plurality of peripheral devices associated with the conveyor system without sacrificing the effectiveness of power and/or communication traveling between each device and logic circuitry.

BRIEF SUMMARY OF THE INVENTION

The present invention addresses the above needs and achieves other advantages by providing a conveyor system for transporting and sorting objects. The conveyor system includes a plurality of lanes that are arranged in series to transport and sort the objects for distribution to a desired location. The conveyor system typically includes a variety of components to facilitate the transport and sorting of objects, such as a main line, conveyor, diverters, and take-away lanes. The conveyor system includes one or more distribution devices associated with one or more of the lanes that are coupled to logic circuitry without requiring hard wiring. The distribution devices enable one or more peripheral devices to be coupled thereto without requiring hard wiring. Thus, the logic circuitry, distribution devices, and peripheral devices may be easily assembled and disassembled from one another. Moreover, cables are employed, where each cable bundles a plurality of wires, and cooperate with the logic circuitry and distribution devices to communicate with one another in real time. As such, the conveyor system reduces the set up and installation time without sacrificing the effectiveness of the conveyor system.

According to one embodiment of the present invention, a conveyor system for sorting objects is provided. The conveyor system includes a plurality of lanes arranged in series with one another, wherein each of the lanes is operable to convey and sort a plurality of objects therealong. The conveyor system also includes at least one peripheral device associated with at least one of the lanes that is operable to facilitate the conveying and sorting of the objects. The system includes logic circuitry in communication with the at least one peripheral device, as well as at least one distribution device in communication with the logic circuitry and the at least one peripheral device. Each distribution device includes a plurality of ports for receiving respective cables therein, and at least one cable couples the logic circuitry and the distribution device and at least one cable couples each peripheral device and the distribution device, wherein each of the cables are coupled without hard wiring.

According to various aspects of the conveyor system, the peripheral device is a sensor, a solenoid, or a motor. For example, each sensor could be a photoelectric sensor or a proximity sensor and could be capable of providing an input signal to the logic circuitry. In this regard, the input signal could be a signal that a lane is jammed, a signal that a lane is full, a signal to divert, or a signal to stop the conveyor. In addition, the logic circuitry (e.g., programmable logic circuitry) may be capable of providing an output signal to a solenoid and/or a motor in response to the input signal from the sensor. For instance, the output signal could be a start signal, a stop signal, a diversion signal, a speed up signal, or a slow down signal.

Moreover, variations of the conveyor system provide a distribution device that includes a port for coupling the logic circuitry and the distribution device, as well as a plurality of ports for coupling a plurality of peripheral devices to a respective port. The cable coupling the logic circuitry and the distribution device could include at least a communication and an electrical component. The distribution device may also be capable of distributing at least the communication and electrical components to each of the peripheral devices through respective cables.

According to additional aspects of the conveyor system, the conveyor system includes at least one trough secured proximate to at least one of the lanes. Each trough includes a channel for carrying the cables therein, wherein each of the distribution devices is secured to a respective trough. Each trough may include a plurality of openings defined therein, wherein each cable is capable of extending through a respective opening and into the channel. Furthermore, the trough could also include a protective cover coupled thereto, such as with the use of a hem on the trough that is capable of engaging a lip defined in the protective cover.

The conveyor system of the present invention has several advantages. For example, the conveyor system provides the installation advantages of networked controls with the reliability and response of hard-wired systems. The conveyor system includes distribution devices that allow logic circuitry and various peripheral devices to be easily assembled and interconnected without the need for hard wiring or an electrician. Furthermore, troubleshooting and maintenance is simplified due to the relative ease of assembly and disassembly of the cables from the distribution devices, and the number of wires is consolidated into a single cable resulting in easier handling and routing between the logic circuitry and the distribution devices. In addition, the conveyor system is capable of providing automated controls for various applications, such as sorting objects, with a real time response. Furthermore, the troughs eliminate conventional techniques for routing cables, such as wire ties, and provide a convenient technique to route cables between the logic circuitry and respective distribution devices such that cables are less likely to be damaged or become tangled with one another.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 18 is a side view of a wire trough according to an additional embodiment of the present invention;

FIG. 19 is a side view of a wire trough according to yet another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
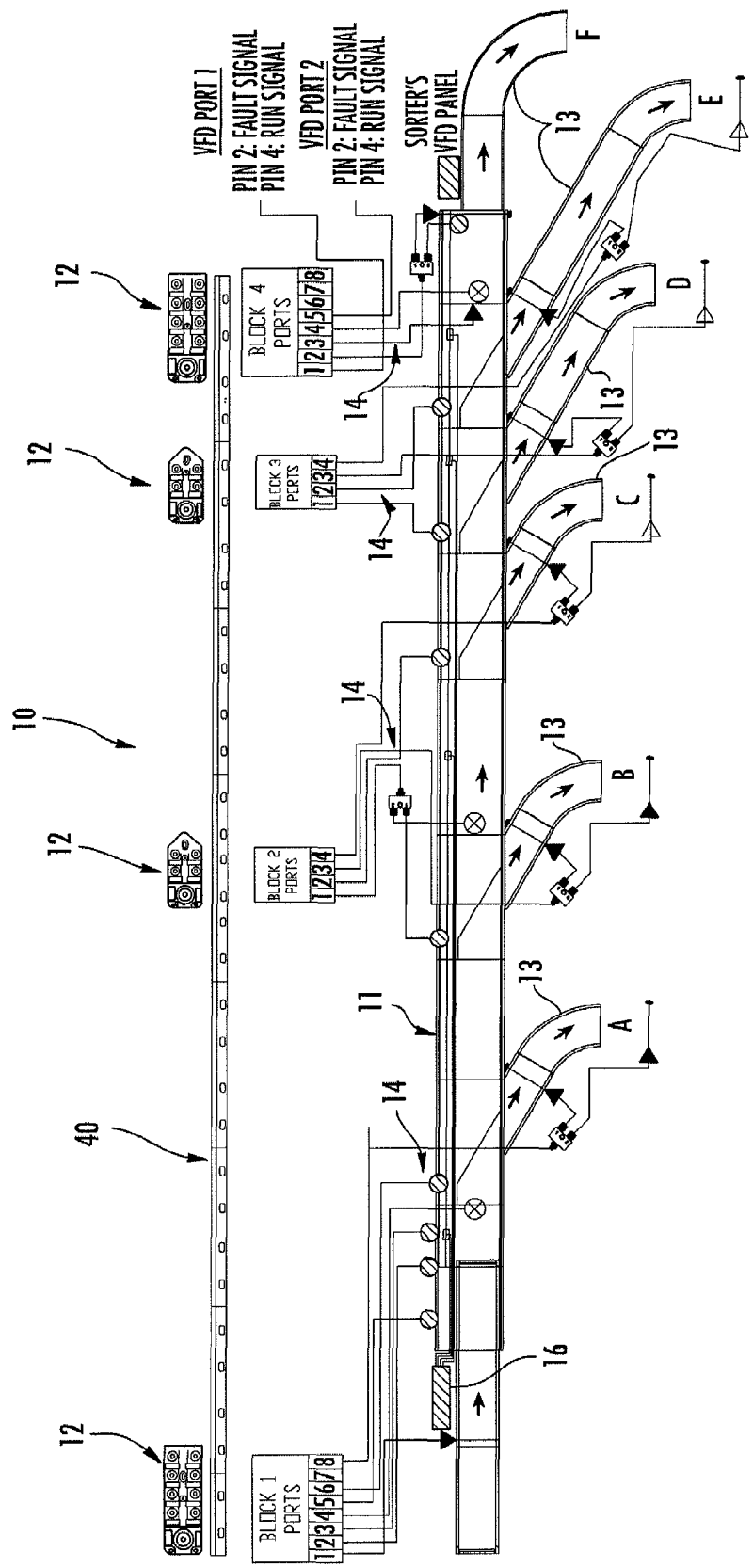
FIG. 1 shows a plan view of a conveyor system according one embodiment of the present invention.

Referring to the figures, and in particular FIG. 1, there is shown a conveyor system 10. The conveyor system 10 includes main line 11 and a plurality of lanes connected in series to sort a variety of objects. In particular, the embodiment shown in FIG. 1 includes five lanes (identified by the letters A, B, C, D, and E) in addition to a discharge lane (identified by the letter F). The conveyor system 10 also includes a plurality of distribution devices 12 for receiving and distributing at least power and/or communication to a plurality of peripheral devices 14 associated with each of the lanes A-F. The distribution devices 12 are advantageously capable of receiving power and/or communication from logic circuitry 16 and distributing the same to a plurality of peripheral devices 14, as will be explained in further detail below.

It should be noted that the number of lanes A-F, distribution devices 12, and peripheral devices 14 illustrated in FIG. 1 is arbitrary as there could be any number of lanes, distribution devices, and peripheral devices depending upon the overall length of the particular conveyor and/or other conveyor design considerations. For example, the conveyor system 10 could be about 20 to 500 feet in length and include a plurality of sorting and diverting locations to transport objects off of a conveyor and to a particular bin, tote, conveyor, or shipping location. The conveyor system 10 may also include various devices to transport and sort the objects. For example, FIG. 1 demonstrates that each lane A-F corresponds to a take-away line 13 that receives objects that are diverted from the main line 11. In addition, various other devices that could be employed with the conveyor system 10 include a conveyor (e.g., belt or rollers) to convey the objects, diverters (e.g., paddles, pushers, transfers, etc.) to divert the objects to specific locations, guides to guide objects to particular locations, etc. For example, see U.S. Patent Application Publication No. 20030094346 to Bonham et al., which is assigned to the present assignee and incorporated herein by reference, for a discussion of exemplary components associated with sorting objects.

Furthermore, although a conveyor system 10 is discussed herein, and in particular, a sorter for sorting various objects, the present invention is applicable to a variety of applications. For example, the distribution devices 12 could be employed with material handling equipment or other systems for handling, sorting, and/or transporting objects, where the objects could be any object, such as boxes, bins, mail, packages, cartons, assemblies on an assembly line, etc. In addition, the term "lane," as used herein, is not meant to be limiting, as the conveyor system 10 may include any number of lanes, lines, chutes, etc. that are arranged in series to handle, sort, and/or transport objects.

Figure 2:
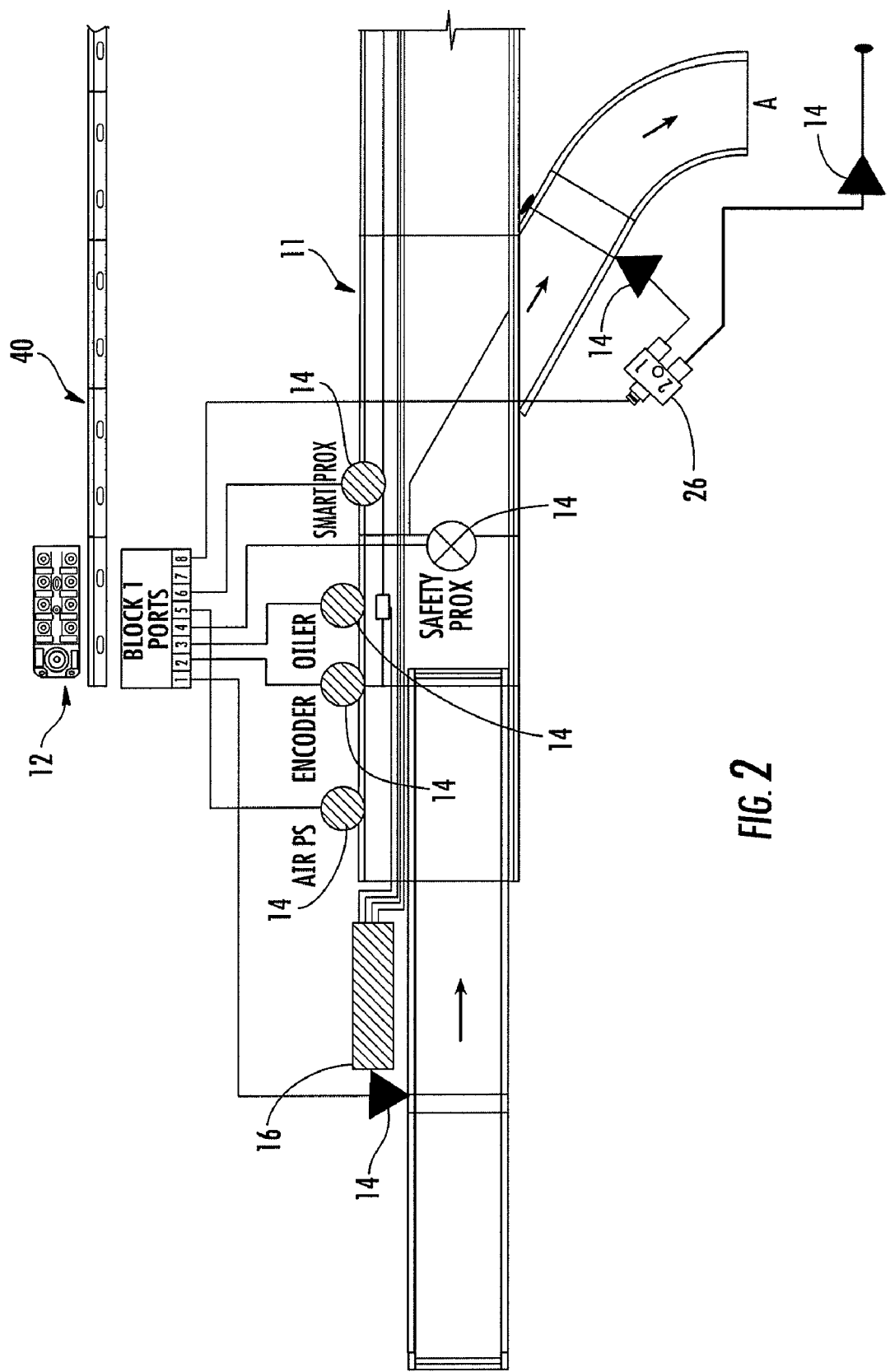
FIG. 2 is a plan view of a first lane of the conveyor system shown in FIG. 1.
Figure 3:
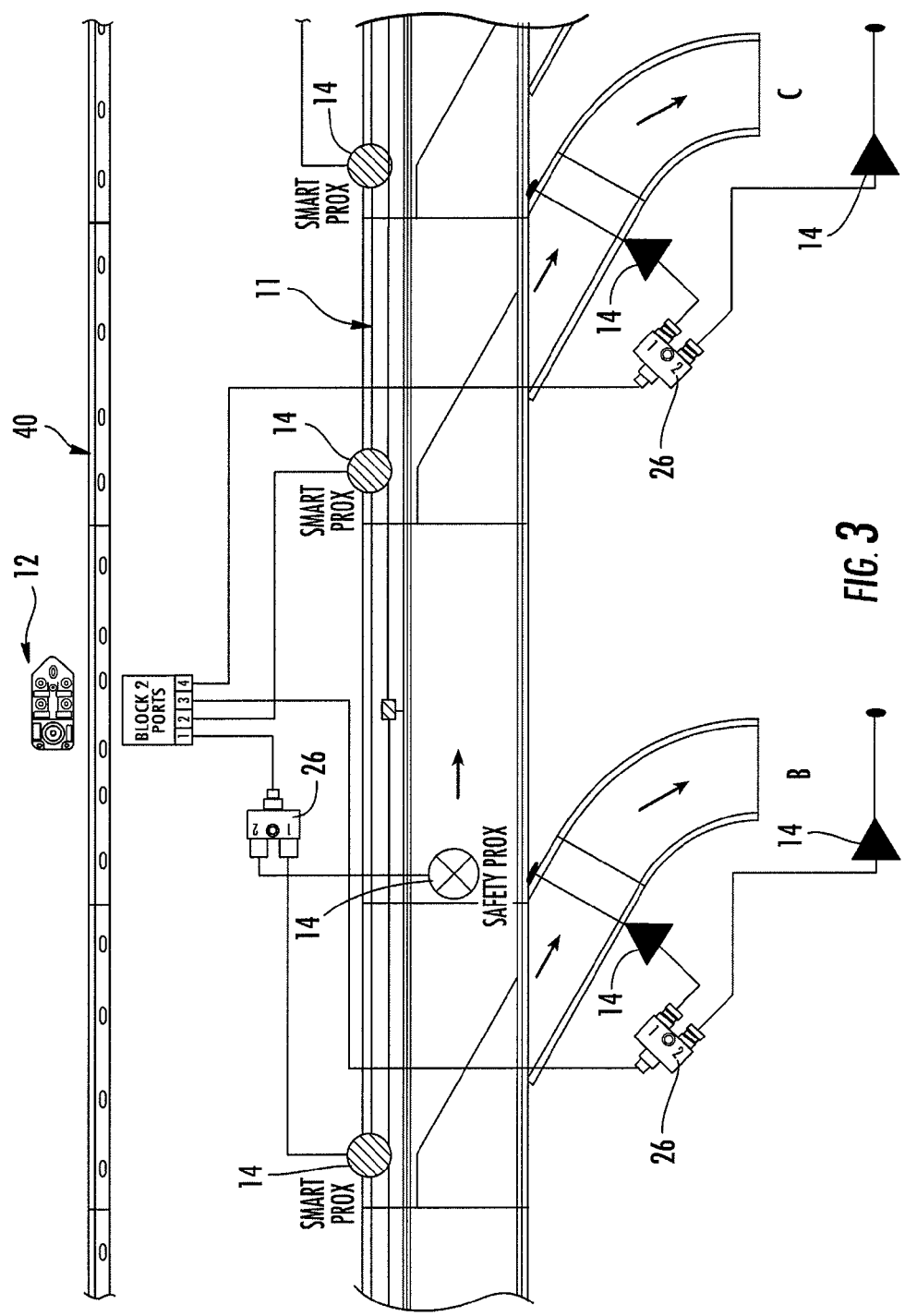
FIG. 3 is a plan view of a second and third lane of the conveyor system shown in FIG. 1.
Figure 4:
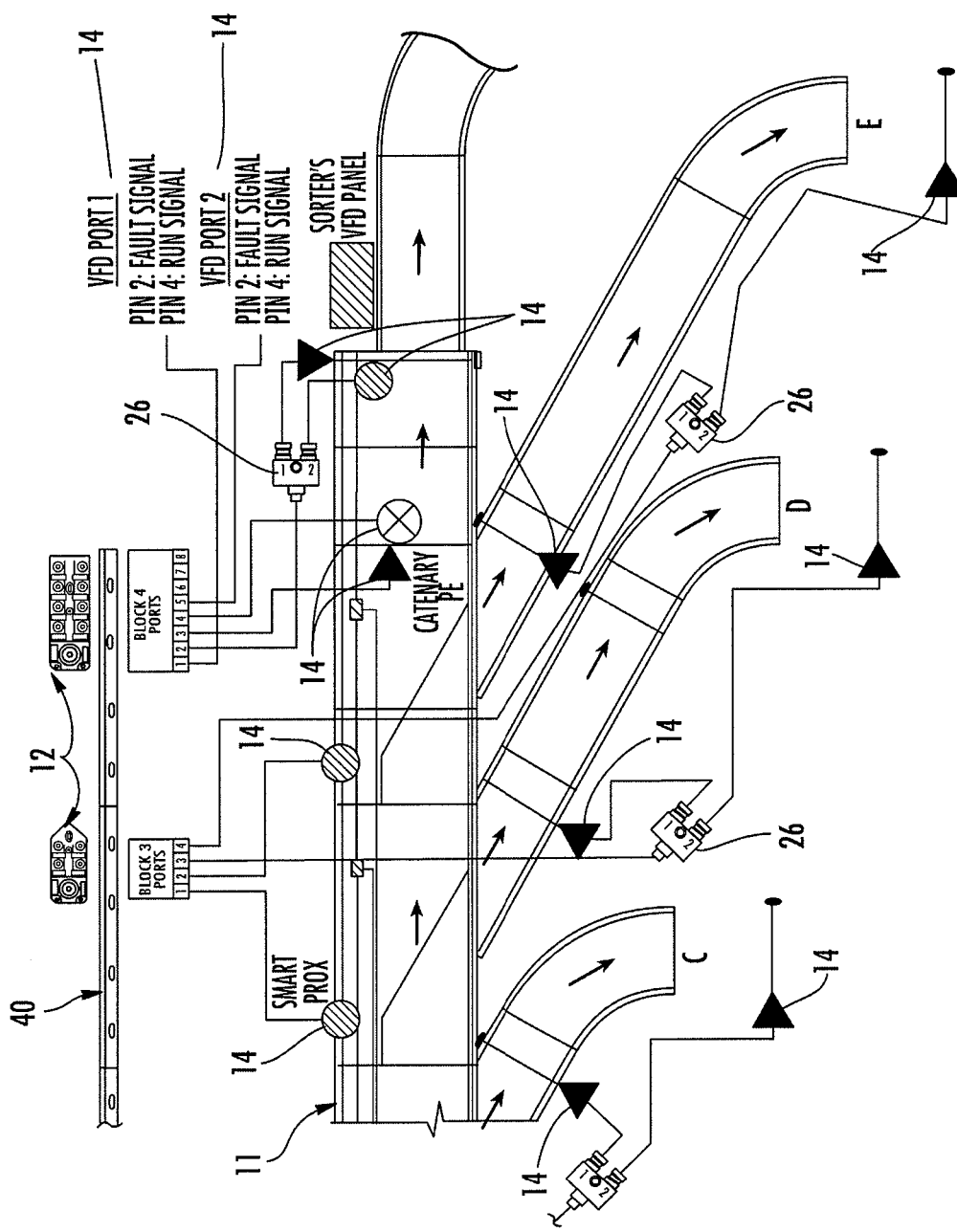
FIG. 4 is a plan view of a fourth and fifth lane of the conveyor system shown in FIG. 1.

The conveyor system 10 includes a plurality of peripheral devices 14 that are associated therewith to facilitate the transport and sorting of objects. FIGS. 2-5 demonstrate that the conveyor system 10 may include various sensors, encoders, and other devices for sorting objects. For example, FIG. 2 illustrates that lane A may include an encoder, proximity sensors, and photoelectric sensors, which are all in communication with a distribution device 12. The sensors and encoders may be used for a variety of applications, for example, to determine the presence or absence of an object at a particular location in a lane and to send a signal to its respective logic circuitry indicating the same. The sensor may be a photoelectric sensor (e.g., catenary, induct, etc.), a proximity sensor (e.g., transition rollers, safety, smart, etc.), an ultrasonic sensor, an air pressure switch, or any other type of sensor that is capable of detecting the presence or absence of an item within the respective lane and providing a signal indicative of the same to the logic circuitry. For instance, one or more sensors could provide a signal to the logic circuitry indicating that a particular lane is full, a jam has occurred, or as confirmation for inventory control. Different types of sensors, and different types of conveying surfaces, may require different positioning of the sensors. For instance, each sensor may be mounted on side rails of the conveyor system 10 and have a field of view in the cross-conveyor direction. In addition, a sensor could be positioned proximate to a take-away point for a particular lane for confirming that an approximate number of objects are being taken away.

Figure 6:
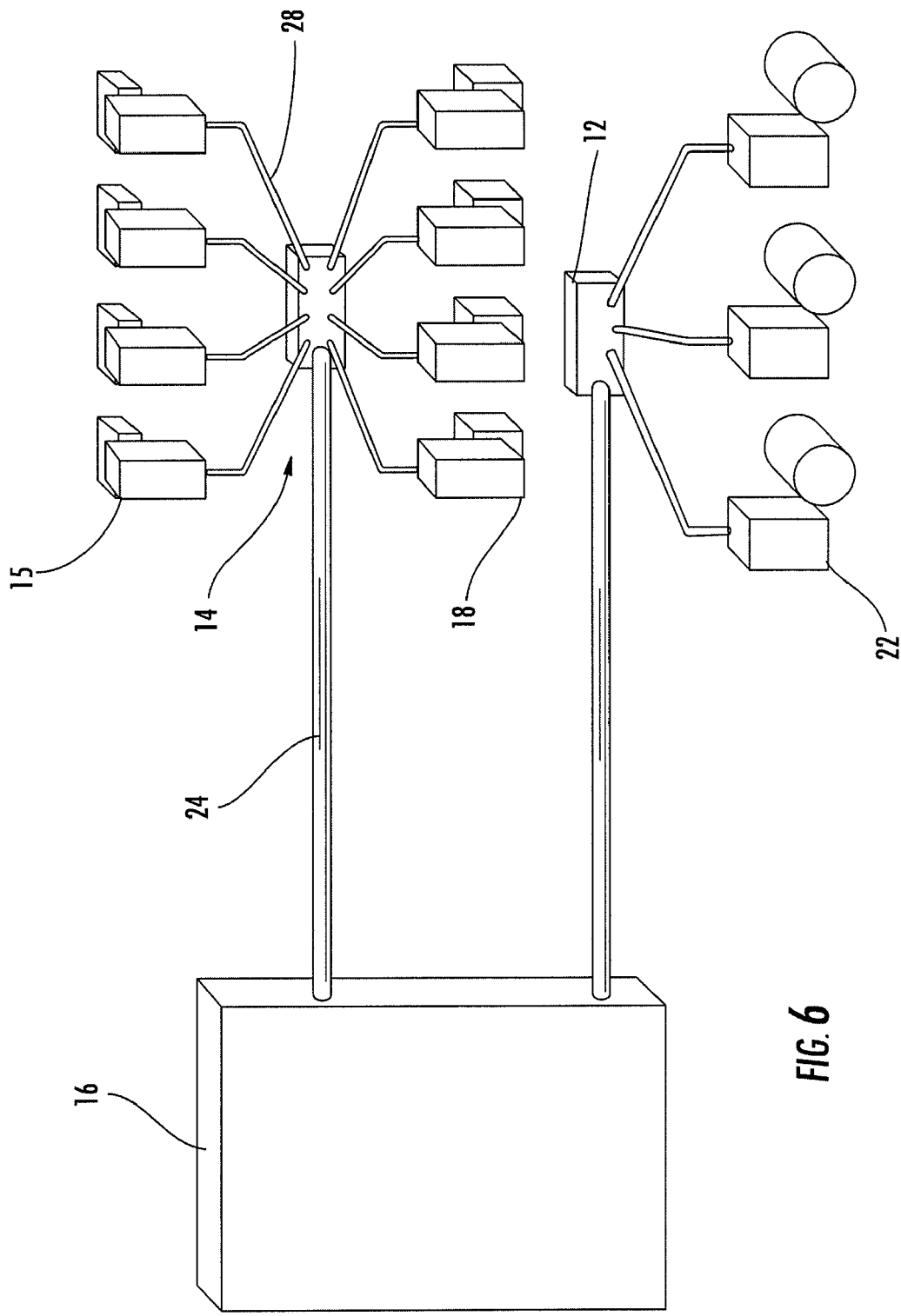
FIG. 6 is a schematic view illustrating the communication between logic circuitry and a plurality of peripheral devices associated with a conveyor system according to one embodiment of the present invention.

Each lane A-F includes one or more devices that may be actuated in response to inputs from the sensors. In this regard, the logic circuitry 16 may provide an output signal to one or more peripheral devices 14 in response to inputs from sensors or other peripheral devices. For example, FIG. 6 demonstrates that logic circuitry may energize solenoids 18 in response to an input from one or more sensors 15 and de-energize the solenoids by removing power to the solenoids. The solenoid 18 could, in turn, activate a device, such as a pneumatic air valve. For instance, activating the air valve could activate a diverter to temporarily stop the conveying or sorting of the objects if a jam is detected by the sensors 15. Thus, the logic circuitry 16 may provide output to one or more peripheral devices 14 in response to input from one or more sensors 15 in order to effectively transport and sort objects.

Figure 5:
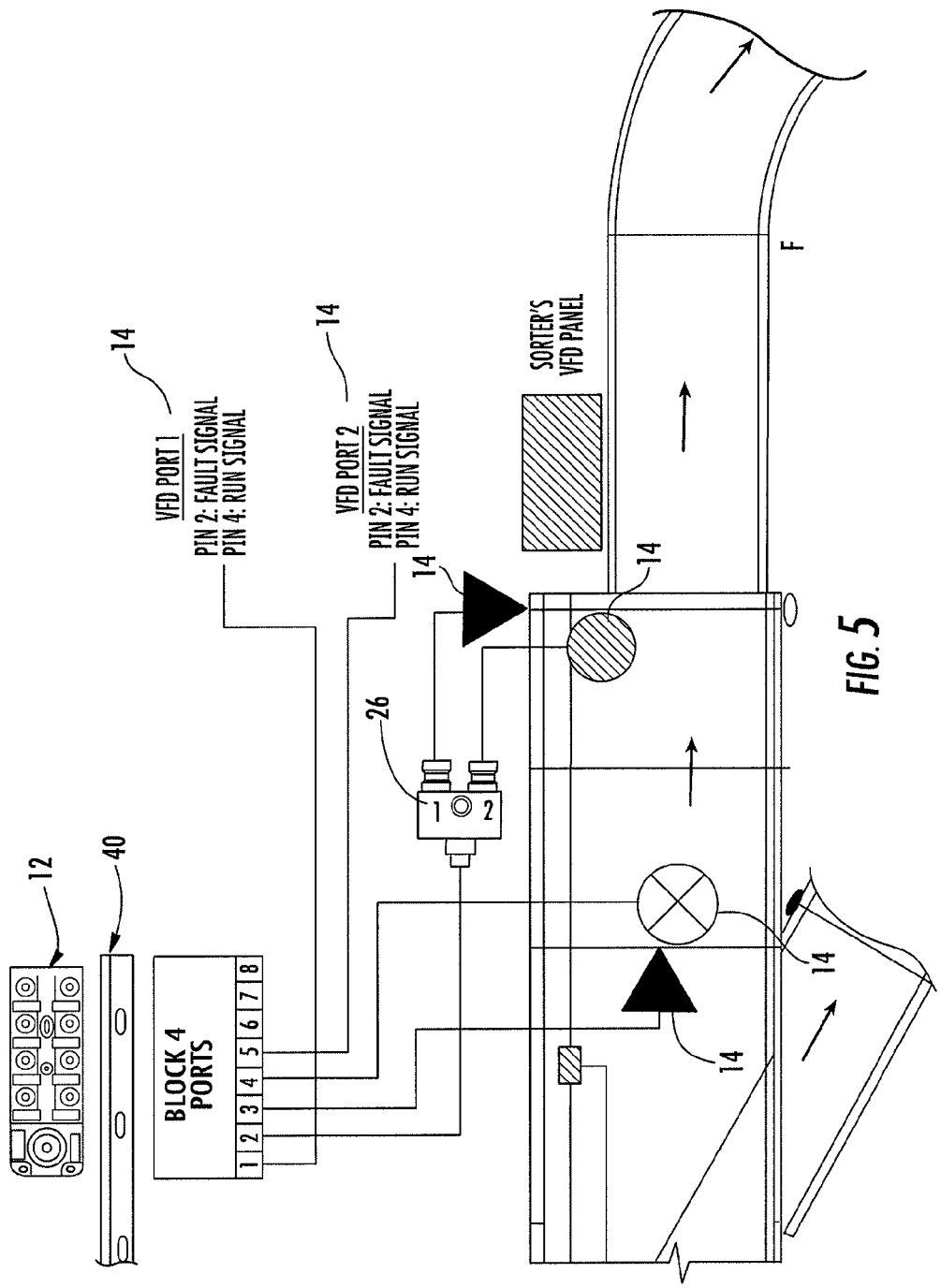
FIG. 5 is an enlarged plan view of the discharge lane of the conveyor system shown in FIG. 1.

Furthermore, the conveyor system 10 could include one or more motors 22 that provide output in response to a particular input from the sensors 15. For example, a motor 22 could start or stop the movement of a specific lane in response to inputs from the sensors. In addition, the motors could operate independently or in conjunction with other devices, such as a pneumatic air valve. Moreover, various other peripheral devices 14 could be employed to provide an output signal to facilitate the transport and sorting of objects, such as an oiler or a variable frequency drive ("VFD"), as known to those of ordinary skill in the art. As shown in FIG. 5, lane F may include a VFD to stop, start, speed up, or slow down the operation of motors driving the main line 11 or lane F.

The conveyor system 10 operates under the control of logic circuitry 16. The logic circuitry 16 is preferably a programmable logic controller ("PLC"), as known to those of ordinary skill in the art, but could be other logic circuitry, such as programmable controls ("PC") or similar controls, capable of automatically controlling the conveyor system 10. In this regard, under the control of the PLC 16, the conveyor system 10 is capable of being programmed to operate automatically and in real time. The PLC 16 provides at least power and/or communication to a variety of peripheral devices associated with each lane A-F. According to one embodiment of the present invention, the PLC 16 provides power to each of the sensors 15 and communicates with each of the sensors. In addition, the PLC 16 may provide a signal to control the power to solenoids 18, motors 22, or other devices.

Figure 7:
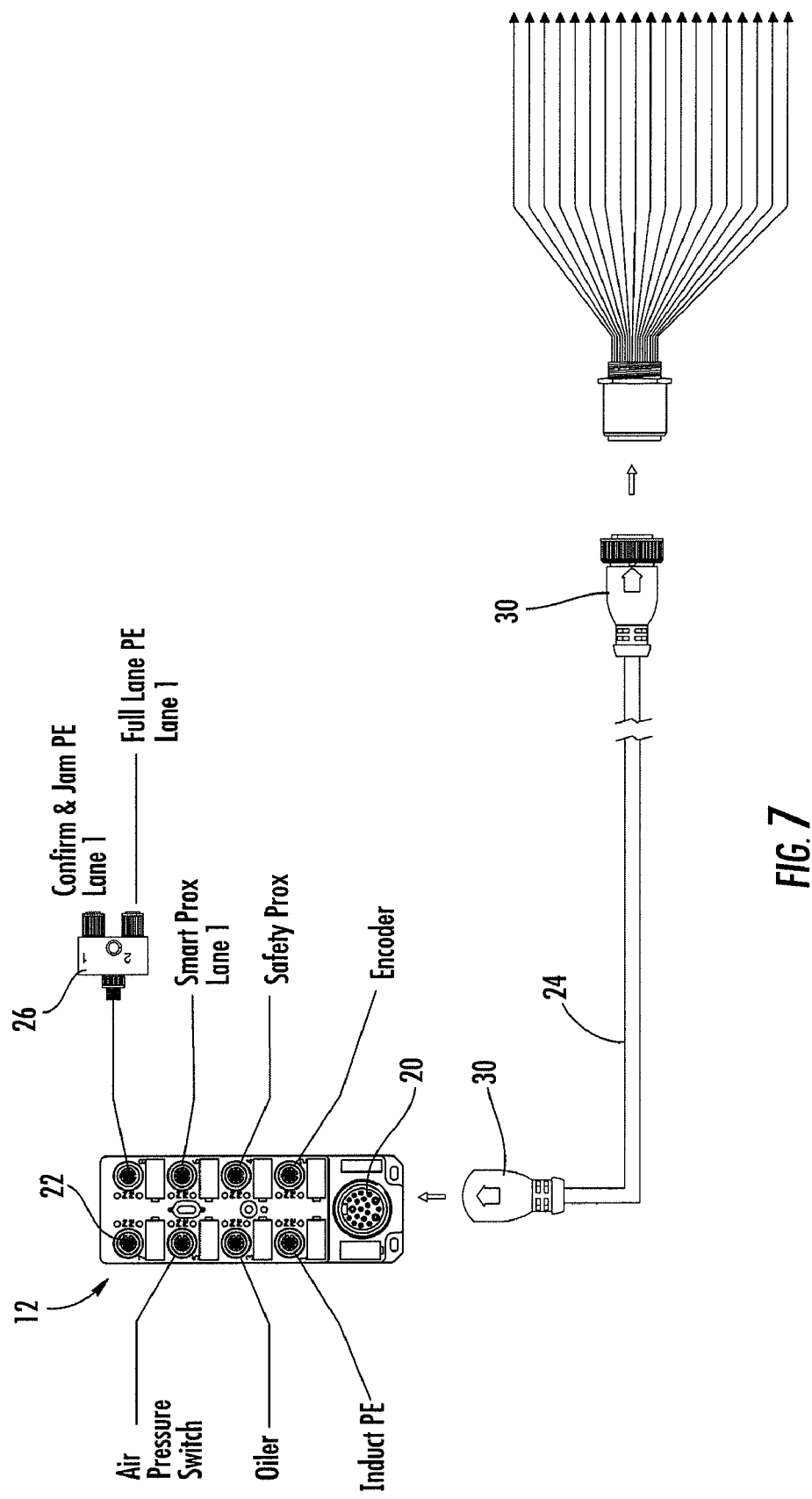
FIG. 7 shows a plan view of a distribution device corresponding to the first lane of the conveyor system depicted in FIG. 3.
Figure 8:
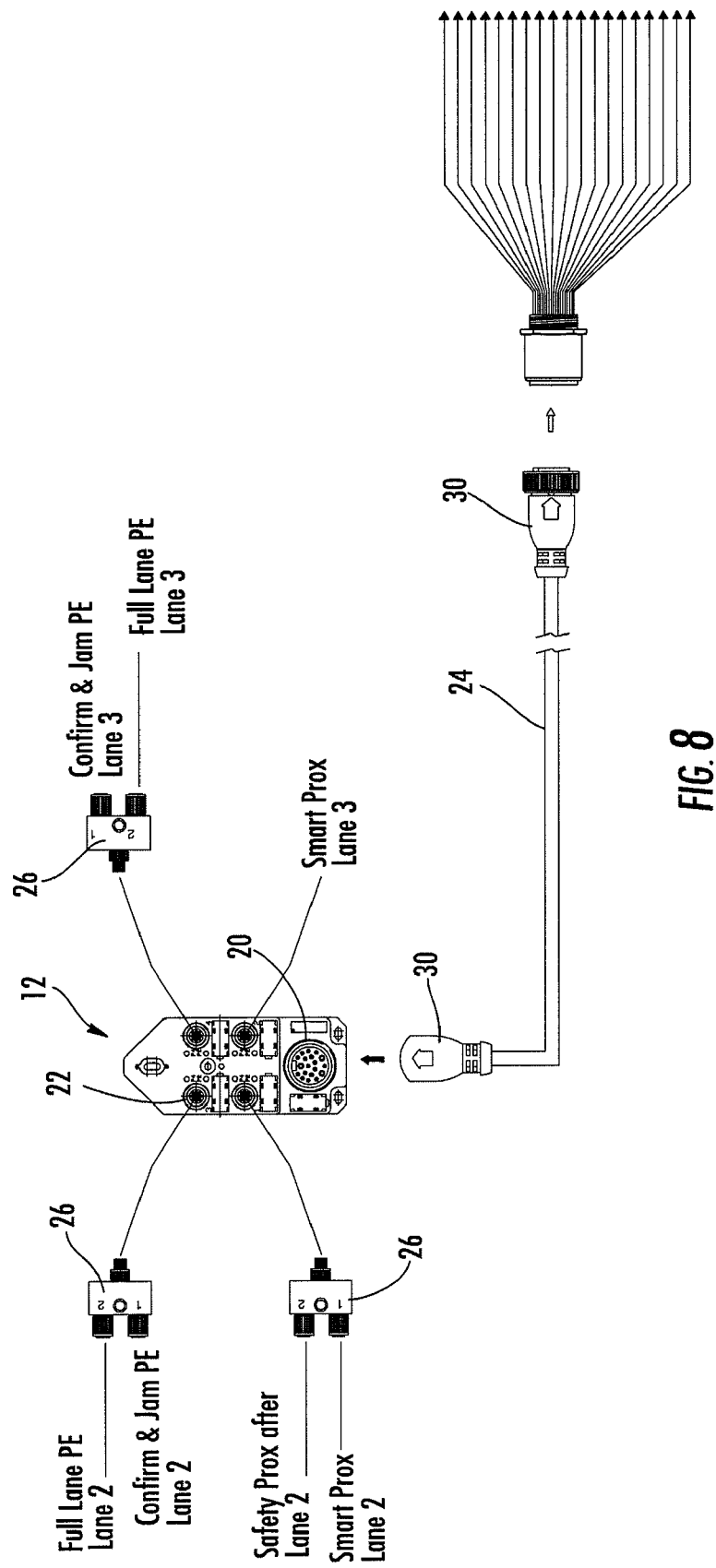
FIG. 8 shows a plan view of a distribution device corresponding to the second and third lanes of the conveyor system depicted in FIG. 4.
Figure 9:
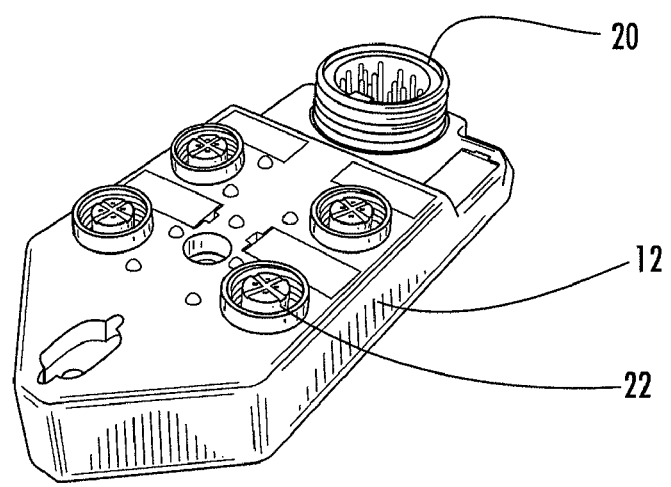
FIG. 9 shows a perspective view of a distribution device according to one embodiment of the present invention.
Figure 10:
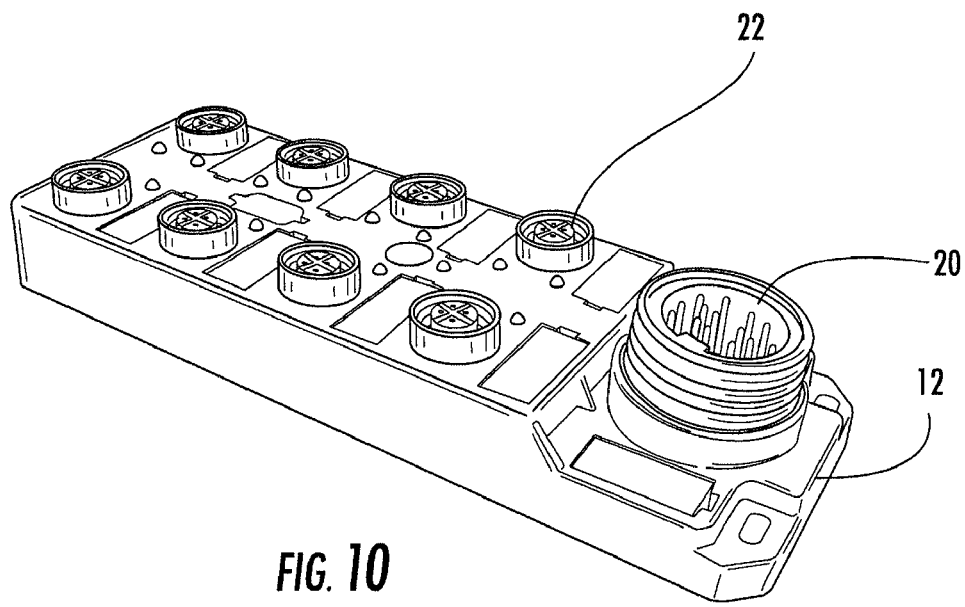
FIG. 10 shows a perspective view of a distribution device according to another embodiment of the present invention.

Each of the peripheral devices 14 is in communication with the PLC 16 via the cables 24 and 28 and distribution devices 12, where "communication" could include an electrical, optical, or other connection transmitting power, signals, and the like therebetween. In particular, FIG. 7 shows a distribution device 12 associated with lane A according to one embodiment of the present invention. The distribution device 12 includes a PLC port 20 that receives an I/O cable 24 from the PLC 16. The distribution device 12 also includes eight ports 22 for receiving respective peripheral device I/O cables 28. Each peripheral device cable 28 may also connect to a splitter 26, which facilitates the connection of a second peripheral device for a single port 22. Thus, the distribution device 12 shown in FIG. 8 (corresponding to lanes B and C) and FIG. 10 have the capability of connecting up to sixteen peripheral devices 14 with the use of a splitter 26 with each port 22. Moreover, FIGS. 8 and 9 illustrate that the distribution device 12 may alternatively include four ports 22, with the capability of accommodating eight peripheral devices with the use of splitters 26. Exemplary distribution devices 12, cords 24 and 28, and splitters 26 are manufactured by Woodhead Connectivity, Inc. (Deerfield, Ill.).

Each of the cables 24 and 28 include connectors on opposing ends that are capable of being quickly connected and disconnected from a respective port without requiring hard wiring. Thus, the PLC cable 24 includes a connector 30 that may be connected to a port in the PLC 16, while the opposite end of the PLC cable also includes a connector that connects to the PLC port 20 in the distribution device 12. Similarly, each peripheral device cable 28 includes a connector 32 that connects to a respective port 22 in the distribution device 12. Each of the connectors 30 and 32 may be plugged into a respective port such that hard wiring is unnecessary and installation time is reduced.

Each of the cables 24 and 28 preferably includes one or more bundles of a plurality of wires. For example, each of the cables 24 and 28 could include one or more wires for transmitting signals between one or more respective peripheral devices, a common wire, a ground wire, and a power wire for powering each of the devices. For example, the cable 24 could include at least a single power wire and a plurality of communication wires, where each peripheral device 14 shares power provided from the cable 24 and may communicate with the PLC 16 via a respective communication wire. Thus, the PLC cables 24 preferably include a sufficient number of wires to distribute at least power and communication to a plurality of peripheral devices 14, while the peripheral device cables 28 include a sufficient number of wires to support at least one peripheral device. As such, each of the peripheral devices 14, such as sensors 15, that connect to each of the ports 22 shares at least power provided through the cables 24 via the distribution devices 12 and cables 28 and may communicate with the PLC 16 via a respective cable 28 and the PLC cable 24. Thus, the distribution device 12 distributes at least power and the ability to communicate provided through each cable 24 to each of the ports 22. However, with respect to some peripheral devices 14, such as solenoids 18, the peripheral devices may only require power to be distributed to each device such that providing the devices with the ability to communicate is unnecessary.

Figure 11:
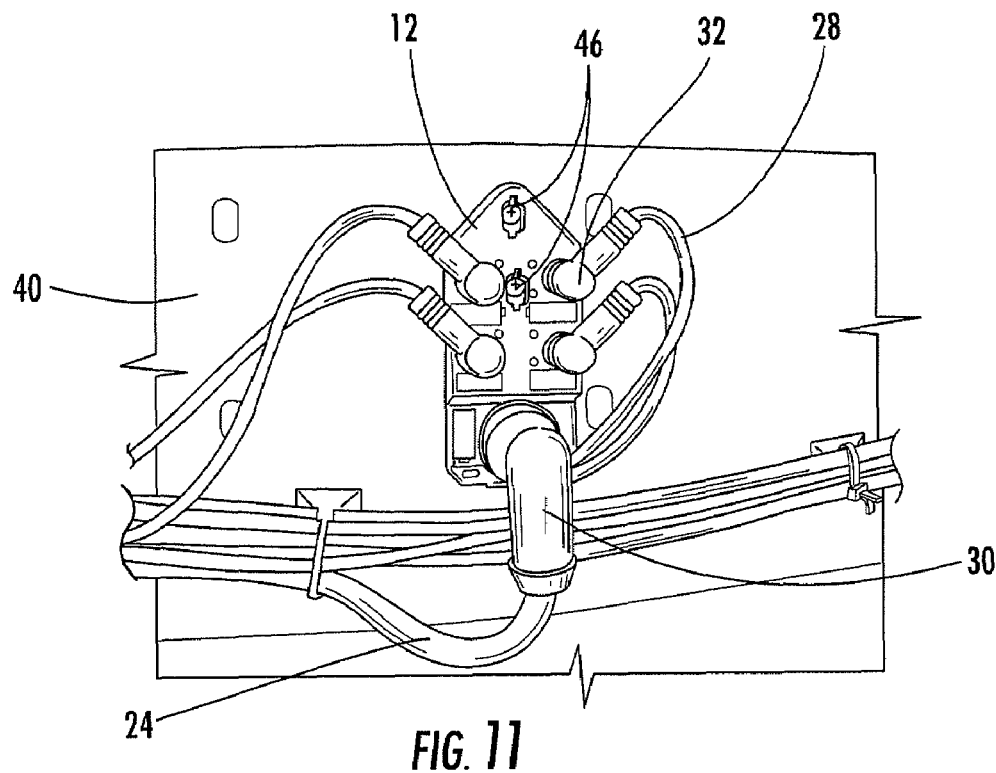
FIG. 11 shows a perspective view of the distribution device of FIG. 9 utilized with a conveyor system according to an additional embodiment of the present invention.
Figure 12:
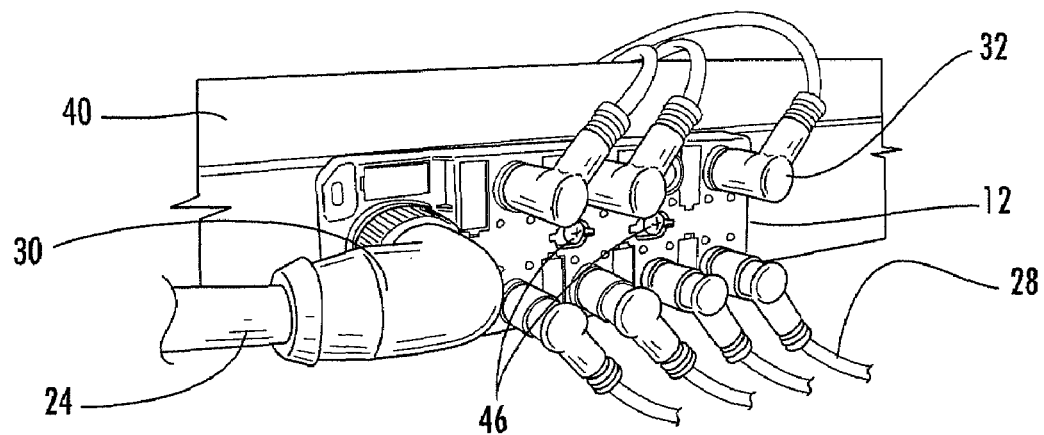
FIG. 12 shows a perspective view of a the I/O distribution device of FIG. 10 utilized with a conveyor system according to yet another embodiment of the present invention.

As shown in FIGS. 7-10, the distribution devices 12 include four or eight ports 22 for receiving respective cables 20. However, it is understood that the distribution devices 12 may have any number of ports 22, but would preferably have a plurality of ports for accommodating a plurality of respective peripheral devices 14. Similarly, each distribution device 12 may include one or more peripheral devices 14 that are connected thereto. For instance, FIG. 11 shows four cables 28 connected to a four-port distribution device 12, FIG. 12 shows cables 28 connected to an eight-port distribution device 12, and FIGS. 13-15 show two cables 28 connected to an eight-port distribution device 12, where each cable may couple to one or more peripheral devices 14.

The conveyor system 10 also includes a trough 40 that is attached to the underside of the main line 11, attached to a side rail of each lane A-F, or otherwise positioned proximate or adjacent to the lanes. The trough 40 is generally employed to route cables between the PLC 16 and each distribution device 12 and, depending on the location of the peripheral devices 14, could also route cables between the distribution device and each peripheral device. Thus, each PLC cable 24 typically runs from the PLC 16, through a channel defined in the trough 40, and to the port 20 in the distribution device 12. As shown in FIGS. 13-15, each trough may include a plurality of slots 42, holes, and the like that enable the cables 24 and 28 to exit the trough 40 and mate with respective ports 20 and 22 on each distribution device 12, as well as exit the trough 40 to mate with the PLC 16 or respective peripheral devices 14. Moreover, each trough 40 includes mounting holes 44 that allow a distribution device 12 to be attached thereto (see FIGS. 18 and 19), such as with fasteners 46. Each distribution device 12 is preferably attached to the trough 40 such that the PLC port 20 is positioned closer to the PLC 16. For instance, the PLC 16 shown in FIG. 13 would be positioned closest to the PLC port 20 such that the PLC cable 24 could run directly through the trough 40 and to the PLC rather than having to wrap around the distribution device 12.

Figure 13:
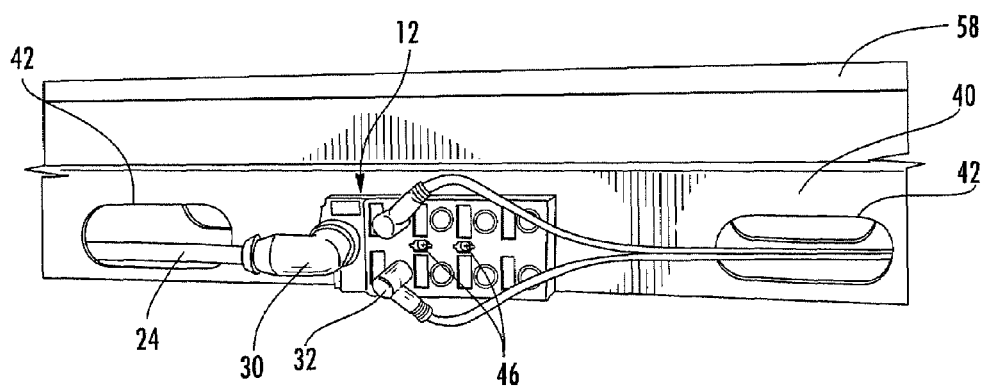
FIG. 13 shows a perspective view of a distribution device according to another embodiment of the present invention.
Figure 14:
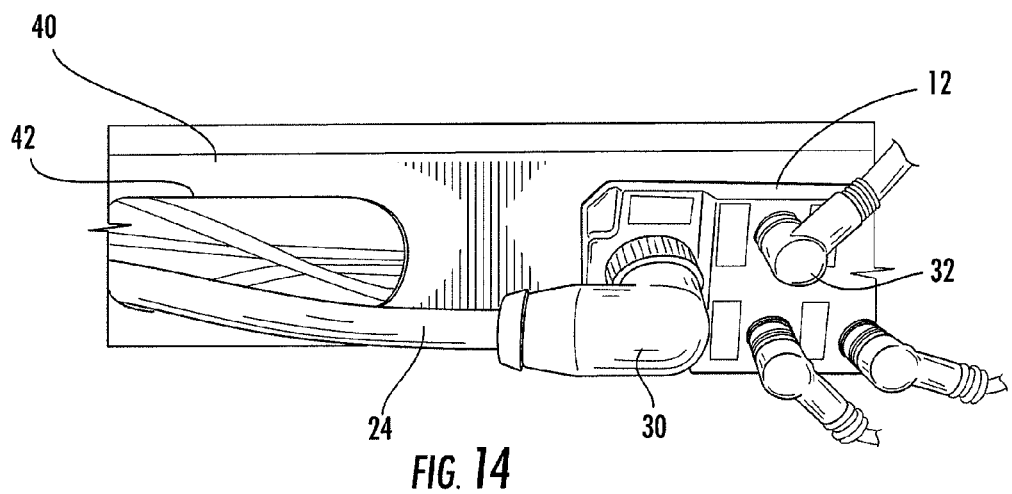
FIG. 14 is an enlarged perspective view of the distribution device shown in FIG. 13.
Figure 15:
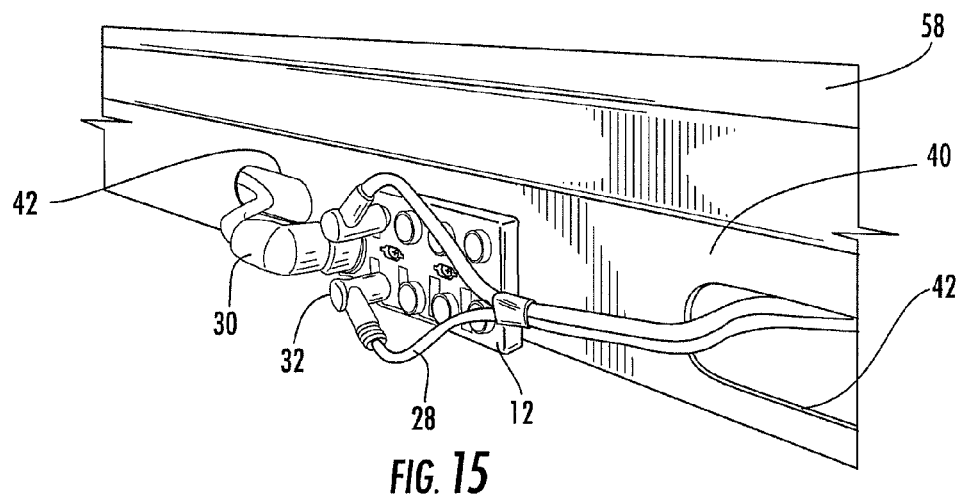
FIG. 15 is another perspective view of the distribution device shown in FIG. 13.

In addition, although FIGS. 13-15 show that the distribution device 12 is attached generally parallel to the longitudinal axis of the trough 40, the distribution device could be attached at various locations and orientations. For instance, FIG. 11 demonstrates that the distribution device 12 could be arranged generally perpendicular to the longitudinal axis of the trough 40. Each trough 40 would typically include two or more slots 42 to accommodate the cables 24 and 28, although the trough could have one or more slots depending on the location of the PLC 16 and the peripheral devices 14, in addition to the orientation of the distribution device. For instance, FIG. 11 demonstrates that a single slot 42 could be utilized where the cables 24 and 28 extend in the same general direction along the trough 40. Moreover, FIG. 12 illustrates that the slots 42 are optional, as the cables 24 and 28 could be directly fed into openings defined in the trough. Similarly, depending on the location of the peripheral devices 14, the cables 28 may be routed directly to a respective peripheral device, as opposed to through the trough 40, if the devices are located proximate to a respective distribution device 12. Additionally, the illustrated embodiments of the present invention are not meant to be limiting, as the trough 40 can be various sizes and configurations depending on the size and/or number of cables traveling therethrough, as well as the number of distribution 12 or peripheral 14 devices. For example, each trough 40 could be about 6 inches in height, about 6 inches in width, and about 8 to 10 feet in length. Each trough 40 could correspond to a respective modular segment of the main line 11, could be a single member that extends the entire length of the main line, could extend along a respective lane A-F, or could extend less than the full length between adjacent segments of the main line.

Figure 20:
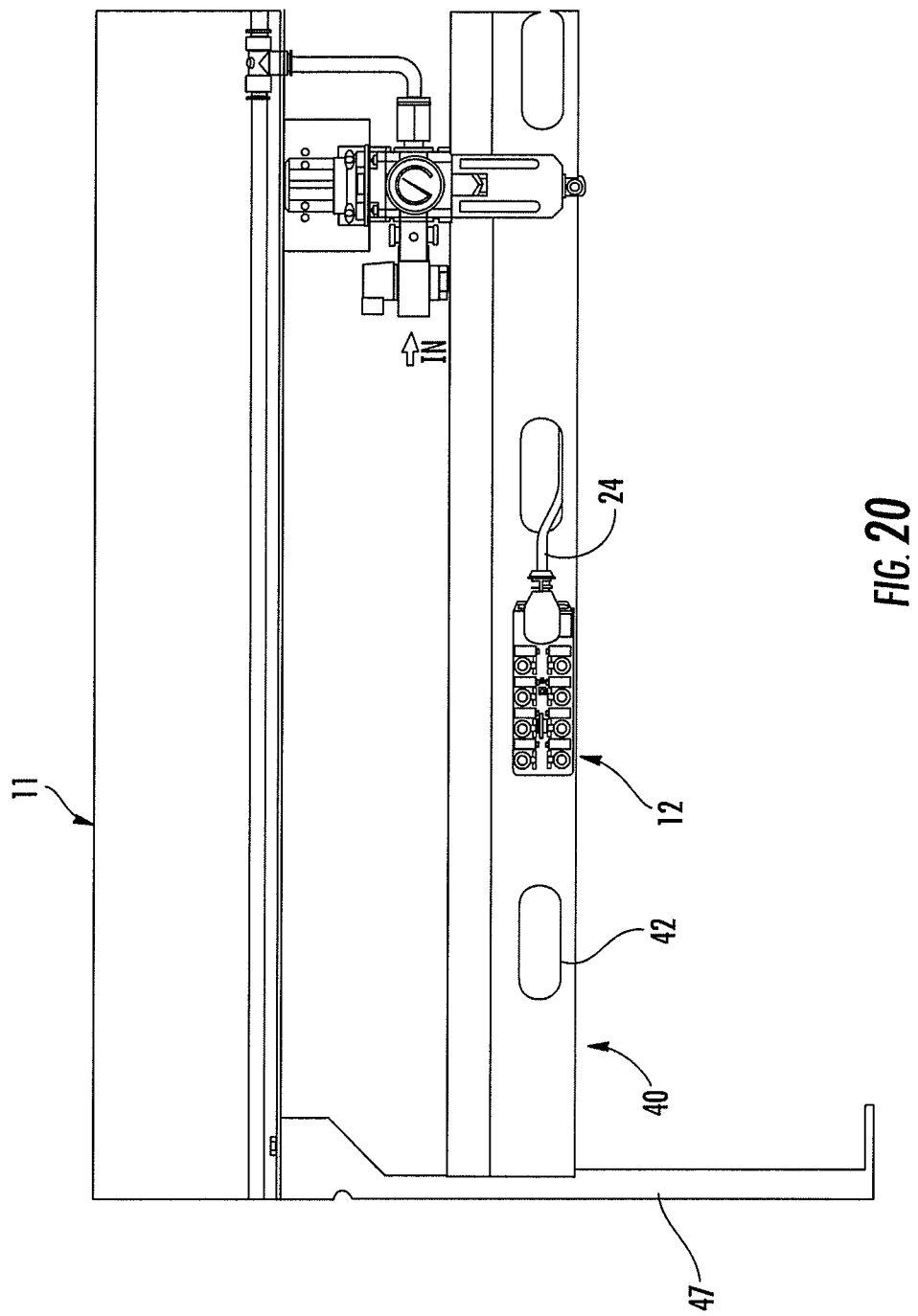
FIG. 20 is a side view of a wire trough secured to the main line of a conveyor system according to one embodiment of the present invention.

Each trough 40 is preferably configured to extend predetermined lengths between support channels 46, where the support channels may be secured to the main line 11, or the trough could be directly secured to the main line. For example, FIG. 20 illustrates that the support channels 46 may be secured to an underside of the main line 11. The troughs 40 may interconnect with one another using various techniques depending on the location, size, or configuration of the trough. For example, FIG. 18 depicts adjoining troughs 40 that are interconnected between support channels 46 with a full bracket 48 and splice plate 50. Similarly, the opposite end of the trough 40 includes a half bracket 52 in a Z-shaped configuration that could secure the trough to a single support channel at an infeed end of the conveyor system 10. FIG. 19 illustrates a trough 40 that is compatible at the discharge end of the conveyor system 10 such that a L-shaped bracket 54 may secure the end of the trough to a catenary 56 or support channel 46. Thus, there may be one or more troughs 40 interconnected to one another along the conveyor system 10 depending on a variety of factors, including the number of distribution devices 12, lanes A-F, and/or the length of the conveyor system.

Figure 16:
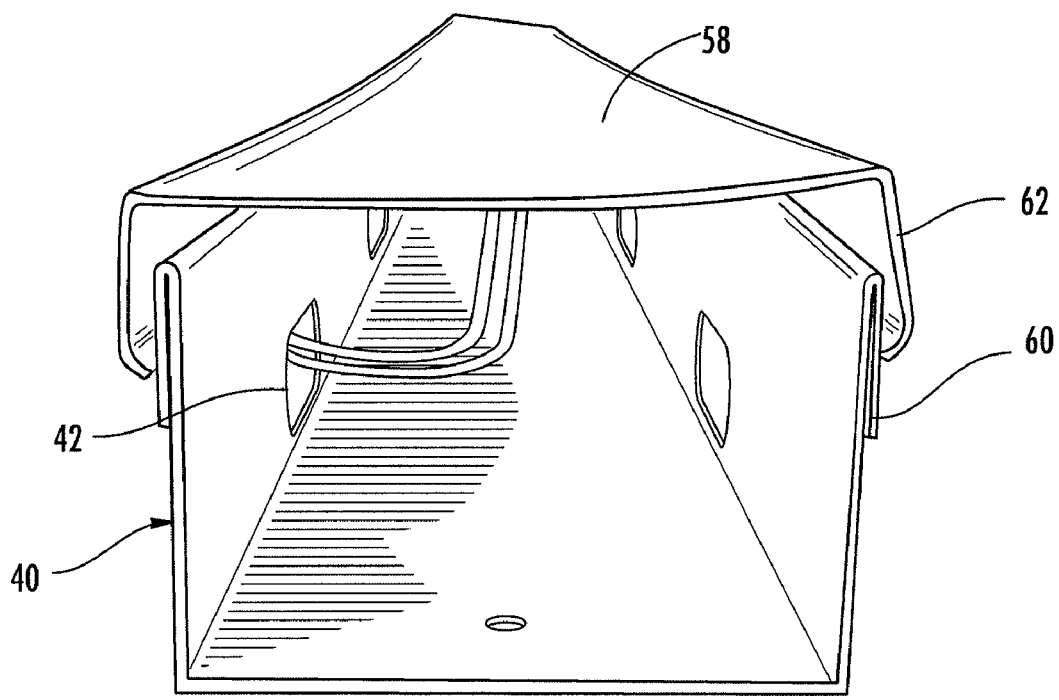
FIG. 16 is an end view of a wire trough partially assembled according to another embodiment of the present invention.
Figure 17:
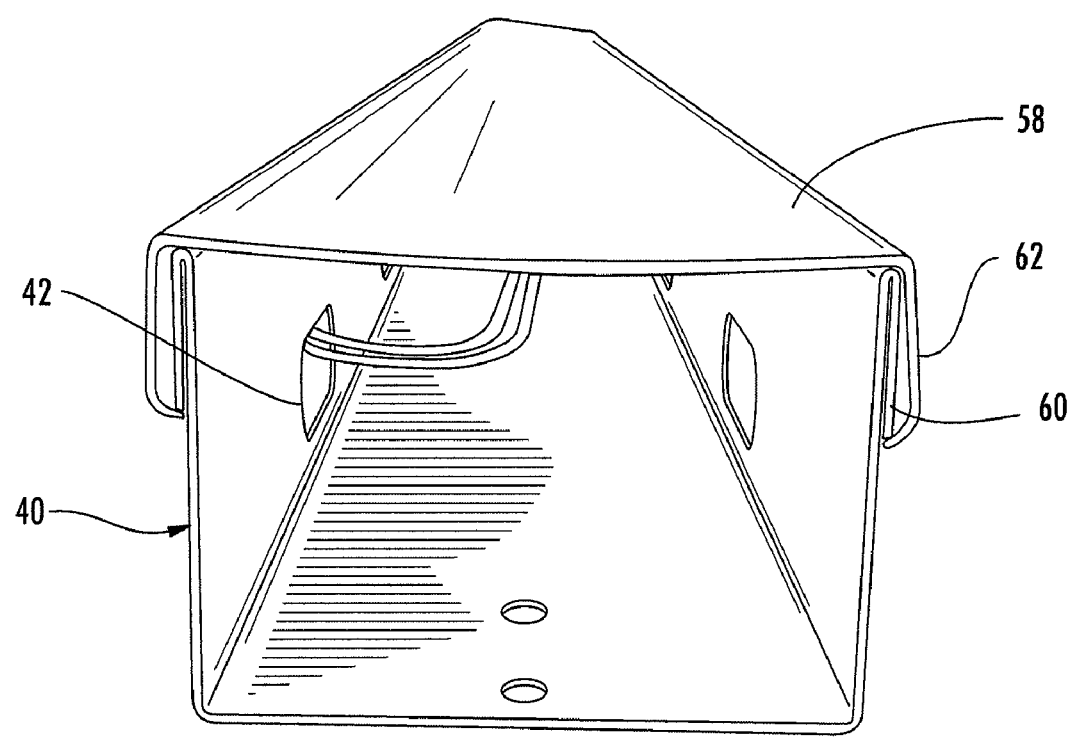
FIG. 17 is an end view of the wire trough of FIG. 16 fully assembled.

Furthermore, the trough 40 preferably includes a cover 58 to protect the cables 24 and 28 positioned within the trough. In particular, FIGS. 16 and 17 illustrate that a portion of the trough 40 is folded over to define a hem 60 that may snap fit with a lip 62 on the cover 58. FIG. 16 shows the cover 58 partially on the trough 40, and as the cover is moved further downwardly, the lip 62 engages the hem 60. Thus, the cover 58 may be readily secured and removed from the trough 40. However, it is understood that the cover 58 may be a variety of configurations, shapes, and sizes depending on the corresponding configuration, shape, and size of the trough. In addition, the cover 58 could be attached to the trough 40 using various techniques, such as with fasteners.

Thus, embodiments of the present invention provide an improved method for assembling a conveyor system 10 for sorting a plurality of objects. For example, the method could include positioning a series of lanes A-F to cooperate with one another to convey and sort objects therealong. In addition, the method could include attaching one or more troughs 40 to one or more of the lanes A-F, as well as attaching one or more distribution devices 12 to a respective trough. Moreover, the method could include coupling a peripheral device(s) 14 to a respective distribution device 12 without the use of hard wiring, and coupling logic circuitry 16 to the distribution device without the use of hard wiring. Thus, as described above, the logic circuitry 16 is capable of communicating with each peripheral device 14 via a respective distribution device 12 without hard wiring. For instance, the method could include coupling each peripheral device 14 and a respective distribution device 12 with a cable 28 and coupling the logic circuitry 16 with a respective distribution device with a cable 24. Furthermore, the method could include positioning each of the cables 24 and 28 within at least one trough 40, and positioning each of the cables through openings 42 defined in each of the troughs such that each of the cables is capable of exiting a respective trough and coupling to a respective distribution device 12. The method could further include securing a protective cover 58 to a respective trough 40.

The conveyor system of the present invention has several advantages. For example, the conveyor system 10 provides the installation advantages of networked controls with the reliability and response of hard-wired systems. The conveyor system 10 includes distribution devices 12 that allow a PLC 16 and various peripheral devices 16 to be easily assembled and interconnected without the need for hard wiring or an electrician. Furthermore, troubleshooting and maintenance is simplified due to the relative ease of assembly and disassembly of the cables from the distribution devices 12, and the number of wires is reduced into a single cable resulting in easier handling and routing between the PLC 16 and the distribution devices 12. In addition, the conveyor system 10 is capable of providing automated controls for various applications, such as sorting objects, with a real time response. Furthermore, the troughs 40 eliminate conventional techniques for routing cables, such as wire ties, and provide a convenient technique to route cables between the PLC 16 and respective distribution devices 12 such that cables are less likely to be damaged or become tangled with one another.

Many other modifications and embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conveyor control system for controlling a conveyor having an elongated movement surface for transporting a plurality of objects, said conveyor control system comprising:

a programmable logic controller configured to at least partially control operation of the conveyor movement surface, said programmable logic controller having a housing and at least one connector supported by said housing;

at least one primary cable comprising at least one power line and a plurality of communication lines bundled together and having a first connector on one end configured to releasably connect to the connector of the programmable logic controller and a second connector on another end;

at least one distribution device having a housing, said housing supporting a primary connector and a plurality of peripheral connectors, said primary connector configured to releasably connect to the second connector of the at least one primary cable, said peripheral connectors connected within the housing to the primary connector and configured to be in communication with the primary connector; and a plurality of peripheral devices configured to facilitate control of the conveyor movement surface by the programmable logic controller, each of the peripheral devices having a peripheral cable and a connector on one end configured to releasably connect to the peripheral connectors of the distribution device, said peripheral cable comprising at least one power line and at least one communication line bundled together;

wherein the connectors allow easy, releasable connection of the peripheral devices via the peripheral cables to the distribution device and the distribution device via the primary cable to the programmable logic controller for communication of conveyor state data from the peripheral devices to the programmable logic controller and communication of operational commands from the programmable logic controller to the peripheral devices.

2. The conveyor control system of claim 1 further comprising a main movement surface for transporting the plurality of objects along a general pathway, a plurality of lanes arranged in series with one another for receiving objects from the main movement surface and transporting the objects received to a plurality of endpoints, and at least one diverter for diverting objects from the main movement surface to at least one of the lanes.

3. The conveyor control system of claim 2 wherein each of the peripheral devices is associated with at least one of the lanes.

4. The conveyor control system of claim 1 wherein the distribution system housing supports eight peripheral connectors for connecting to the peripheral cables of the peripheral devices.

5. The conveyor control system of claim 1 further comprising at least one splitter having a first connecting end configured to connect to one of the peripheral connectors of the distribution devices and a second connecting end configured to connect to two peripheral cables, whereby said splitter facilitates the communication of two peripheral devices with the programmable logic controller through one of the peripheral connectors of the distribution device.

6. The conveyor control system of claim 1 further comprising a trough secured proximate to the elongated movement surface and supporting each of the at least one distribution device, said trough forming a channel and defining a plurality of openings therein, wherein the at least one primary cable and the peripheral cables are extendable along the channel of the trough and are capable of entering and exiting the channel through the openings.

7. The conveyor control system of claim 6 wherein the trough includes a protective cover configured to engage the channel and form a housing for the cables extending within the channel.

8. The conveyor control system of claim 1 wherein each of the peripheral devices is a sensor, an encoder, a sorter, or a solenoid.

9. A conveyor system for sorting a plurality of objects comprising:
 a main line comprising at least one conveyor for transporting the plurality of objects along the main line;
 at least one diverter for diverting objects off of the main line and to a predetermined location;
 a plurality of lanes arranged in series with one another and capable of receiving objects from the diverter;
 a plurality of peripheral devices associated with at least one of the lanes and operable to facilitate the conveying and sorting of the objects;
 a programmable logic controller in communication with the plurality of peripheral devices; and
 a plurality of distribution devices in communication with the programmable logic controller and at least one peripheral device, each distribution device including a plurality of ports for receiving respective cables therein, wherein at least one cable couples the programmable logic controller and each distribution device, and at least one cable couples each peripheral device to a respective distribution device, and wherein each of the cables are releasably coupled.

10. The conveyor system of claim 9 further comprising a trough secured proximate to at least one of the lanes, each trough comprising a channel for carrying the cables therein, wherein each trough comprises a plurality of openings defined therein, wherein each cable is capable of extending through a respective opening and into the channel, and wherein each of the distribution devices is secured to the trough.

11. The conveyor system of claim 9 wherein each of the cables comprises at least one power line and at least one communication line bundled together.

12. The conveyor system of claim 9 further comprising at least one splitter having a first end and a second end, said first end capable of being received by one of the ports of the distribution device and in communication with the programmable logic controller, said second end configured to couple with two peripheral cables and in communication with two peripheral devices.

13. A method of controlling a conveyor system comprising:
 providing an elongated movement surface and a plurality of lanes, said lanes intersecting said elongated movement surface and arranged in series for transporting goods from a start point to a plurality of end points corresponding to each of the lanes;
 installing at least one peripheral device proximate to at least one of the lanes;
 connecting at least one peripheral cable from the at least one peripheral device to a distribution device;
 connecting a primary cable from a programmable logic controller to the distribution device;
 detecting a conveyor state of at least one lane through the at least one peripheral device;
 transmitting the conveyor state data from the at least one peripheral device to the programmable logic controller through the distribution device;
 processing an operational command in the programmable logic controller in response to the conveyor state data received from the at least one peripheral device;
 transmitting the operational command from the programmable logic controller to the at least one peripheral device through the distribution device; and
 performing an operation on the at least one lane to facilitate the transportation of the goods corresponding to the at least one lane to the respective end point.

14. The method of claim 13 further comprising securing the distribution device to a trough, said trough extending from the start point to at least one of the end points.

15. The method of claim 14 further comprising:
 threading the at least one peripheral cable from the at least one peripheral device into a channel formed within the trough through a first opening in the trough;
 extending the at least one peripheral cable along the channel;
 threading the at least one peripheral cable out of the channel through a second opening in the trough to connect the at least one peripheral cable to the distribution device;
 threading the primary cable from the programmable logic controller into the channel through a third opening in the trough;
 extending the primary cable along the channel; and
 threading the primary cable out of the channel through a fourth opening in the trough to connect the primary cable to the distribution device.

16. The method of claim 13 further comprising installing a splitter onto a peripheral connector of the distribution device to allow two peripheral cables to be in communication with the programmable logic controller through the one peripheral connector.

17. The method of claim 13 further comprising changing the configuration of the conveyor system, including the step of disconnecting one of the at least one peripheral cable from the distribution device.

18. The method of claim 17 further comprising connecting at least one different peripheral cable from at least one different peripheral device to the distribution device.

19. The method of claim 13 further comprising performing maintenance on the programmable logic controller, including:
 providing a back-up controller;
 connecting a back-up primary cable of the back-up controller to the distribution device; and
 disconnecting the primary cable of the programmable logic controller from the distribution device to allow maintenance work to be done on the programmable logic controller without ceasing operation of the conveyor system.

20. The method of claim 13 further comprising transmitting the operational command from the programmable logic controller to a plurality of peripheral devices in response to receiving the conveyor state data from the at least one peripheral device, whereby operation of the conveyor system is adjusted accordingly.

* * * * *